(12) United States Patent
Mimura et al.

(10) Patent No.: US 11,909,027 B2
(45) Date of Patent: Feb. 20, 2024

(54) METHOD FOR MANUFACTURING ELECTRODE AND APPARATUS FOR MANUFACTURING ELECTRODE

(71) Applicants: Prime Planet Energy & Solutions, Inc., Tokyo (JP); TOYOTA JIDOSHA KABUSHIKI KAISHA, Toyota (JP)

(72) Inventors: Tetsuya Mimura, Chiryu (JP); Katsushi Enokihara, Toyota (JP)

(73) Assignees: PRIME PLANET ENERGY & SOLUTIONS, INC., Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 84 days.

(21) Appl. No.: 17/511,989

(22) Filed: Oct. 27, 2021

(65) Prior Publication Data

US 2022/0158153 A1    May 19, 2022

(30) Foreign Application Priority Data

Nov. 18, 2020  (JP) .................................. 2020-191778

(51) Int. Cl.
*B29C 43/24*        (2006.01)
*B29C 43/28*        (2006.01)
(Continued)

(52) U.S. Cl.
CPC ........... *H01M 4/0404* (2013.01); *B29C 43/24* (2013.01); *B29C 43/28* (2013.01); *B29C 43/46* (2013.01);
(Continued)

(58) Field of Classification Search
CPC ....... B29C 43/24; B29C 43/28; B29C 43/305; B29C 43/46; B29C 2043/5825; B29C 2043/5875; B29L 2031/3468; B32B 5/16; B32B 15/16; B32B 15/20; B32B 37/24; B32B 2037/243; B32B 2457/10; H01M 4/04; H01M 4/0402; H01M 4/0404; H01M 4/0409; H01M 4/043; H01M 4/0435; H01M 4/139; H01M 10/0525; H01M 10/058; Y02E 60/10; Y02P 70/50
See application file for complete search history.

(56) References Cited

FOREIGN PATENT DOCUMENTS

JP          2016-219343 A      12/2016
JP          2016219343 A  *    12/2016
(Continued)

*Primary Examiner* — Michael A Tolin
(74) *Attorney, Agent, or Firm* — HAUPTMAN HAM, LLP

(57) ABSTRACT

A method for manufacturing an electrode disclosed herein includes: steps of forming a coating film composed of an electrode material by passing the electrode material through a gap between a rotating first roll and a rotating second roll; adhering the coating film to the second roll and conveying the coating film; and transferring the conveyed coating film onto an electrode current collector conveyed by a conveying device to form an electrode mixture layer composed of the coating film. The speed ratio between a peripheral speed of the second roll and a conveying speed of the electrode current collector is changed by changing the peripheral speed of the second roll on the basis of the thickness of the coating film or the width of the gap. The timing of the change in the speed ratio is allowed to be based on the Equation (1) described in the description.

2 Claims, 3 Drawing Sheets

(51) Int. Cl.
    *B29C 43/46*     (2006.01)
    *B29C 43/58*     (2006.01)
    *B32B 37/24*     (2006.01)
    *B32B 5/16*     (2006.01)
    *H01M 4/139*     (2010.01)
    *B32B 15/16*     (2006.01)
    *B32B 15/20*     (2006.01)
    *H01M 4/04*     (2006.01)
    *H01M 10/0525*     (2010.01)

(52) U.S. Cl.
    CPC ............... *B32B 5/16* (2013.01); *B32B 15/16* (2013.01); *B32B 15/20* (2013.01); *H01M 4/0435* (2013.01); *H01M 4/139* (2013.01); *B29C 2043/5825* (2013.01); *B29C 2043/5875* (2013.01); *B32B 2037/243* (2013.01); *B32B 2457/10* (2013.01); *H01M 10/0525* (2013.01)

(56) References Cited

FOREIGN PATENT DOCUMENTS

| | | | |
|---|---|---|---|
| JP | 2017-69131 | A | 4/2017 |
| JP | 2017-94248 | A | 6/2017 |
| JP | 2017-94552 | A | 6/2017 |
| JP | 2017-174522 | A | 9/2017 |
| JP | 2018-37198 | A | 3/2018 |
| JP | 2018037198 | A * | 3/2018 |

\* cited by examiner

METHOD FOR MANUFACTURING ELECTRODE AND APPARATUS FOR MANUFACTURING ELECTRODE

CROSS-REFERENCE TO RELATED APPLICATIONS

The present application claims priority based on Japanese Patent Application No. 2020-191778 filed on Nov. 18, 2020, and the entire contents of the application are incorporated herein by reference.

BACKGROUND OF THE INVENTION

1. Field of the Invention

The present disclosure relates to a method for manufacturing an electrode, the method including passing an electrode material through a gap between a pair of rotating rolls to form a coating film composed of the electrode material, adhering the coating film to one of the rolls and transferring the coating film onto an electrode current collector conveyed by a conveying device, and forming an electrode mixture layer composed of the coating film. The present disclosure also relates to an apparatus for manufacturing an electrode that is suitable for carrying out the manufacturing method.

2. Description of the Related Art

In recent years, secondary batteries such as lithium ion secondary batteries have been advantageously used as portable power sources for personal computers, mobile terminals, and the like, and vehicle drive power sources for electric vehicles (EV), hybrid vehicles (HV), plug-in hybrid vehicles (PHV), and the like.

An electrode in which an electrode mixture layer including an active material is provided on an electrode current collector is generally used as an electrode of a secondary battery, in particular a lithium ion secondary battery. One method for manufacturing such an electrode includes passing an electrode material including an active material through a gap between a pair of rotating rolls to form a coating film, adhering the coating film to one roll (hereinafter, also referred to as "transfer roll") among the pair of rolls, and transferring the adhered coating film onto an electrode current collector conveyed by a conveying device to form an electrode mixture layer composed of the coating film.

Here, in order to stabilize the performance and quality of the electrode at a high level, it is important to reduce the variation in the weight per unit area of the coating film composed of the electrode material transferred onto the electrode collector (that is, the weight per unit surface area). Therefore, Japanese Patent Application Publication No. 2016-219343 proposes changing the speed ratio between the rotation speed of the transfer roll and the conveying speed of the electrode current collector on the basis of the width of the gap between the pair of rolls in order to reduce the variation in the weight per unit area. Further, Japanese Patent Application Publication No. 2018-37198 proposes changing the speed ratio on the basis of the film thickness of the coating film on the transfer roll, instead of the width of the gap between the pair of rolls. Further, Japanese Patent Application Publication No. 2016-219343 proposes a method of changing the speed of the conveying device, a method of changing the speed of the transfer roll, and a method of changing both the speed of the pair of rolls and the speed of the conveying device as a method of changing the speed ratio between the rotation speed of the transfer roll and the conveying speed of the electrode current collector.

SUMMARY OF THE INVENTION

The present inventors conducted a study by adopting a method of changing the speed of the transfer roll as a method of changing the speed ratio between the rotation speed of the transfer roll and the conveying speed of the electrode current collector. As a result, it has been found that in the related art, there is still room for improvement in reducing the variation in the weight per unit area of the coating film (that is, the electrode mixture layer) transferred onto the electrode current collector.

Therefore, an object of the present disclosure is to provide a method for manufacturing an electrode including forming a coating film of an electrode material by a roll and transferring the coating film to a current collector, the method making it possible to highly suppress the variation in the weight per unit area of the transferred coating film composed of the electrode material.

The method for manufacturing an electrode disclosed herein includes a step of forming a coating film composed of an electrode material by passing the electrode material through a gap between a rotating first roll and a rotating second roll, a step of adhering the coating film composed of the electrode material to the second roll and conveying the coating film, and a step of transferring the conveyed coating film onto an electrode current collector conveyed by a conveying device to form an electrode mixture layer composed of the coating film. Here, the speed ratio between a peripheral speed of the second roll and a conveying speed of the electrode current collector is changed by changing the peripheral speed of the second roll on the basis of the thickness of the coating film or the width of the gap. The timing of the change in the speed ratio is allowed to be based on the following Equation (1).

$$t = t_{\_const} \times \{B_x / B_{ave}\} \quad (1)$$

(a) where the peripheral speed of the second roll is changed based on the thickness of the coating film:

t: waiting time from the measurement of the thickness of the coating film adhered to the second roll to the execution of the peripheral speed change of the second roll;

$t_{\_const}$: set value of the waiting time from the measurement of the thickness of the coating film adhered to the second roll to the execution of the peripheral speed change of the second roll;

$B_x$: measured value of the thickness of the coating film adhered to the second roll;

$B_{ave}$: average of measured values of the thickness of the coating film adhered to the second roll.

(b) where the peripheral speed of the second roll is changed based on the width of the gap:

t: waiting time from coating film formation in the gap to execution of peripheral speed change of the second roll;

$t_{\_const}$: set value of the waiting time from coating film formation in the gap to execution of peripheral speed change of the second roll;

$B_x$: value of the gap width;

$B_{ave}$: average of values of the gap width.

With such a configuration, it is possible to manufacture an electrode in which the variation in the weight per unit area of the transferred coating film composed of the electrode material is highly suppressed. Further, in the manufacturing method, the electrode material is desirably a wet granulated body.

From another aspect, the apparatus for manufacturing an electrode disclosed herein includes a first roll, a second roll arranged to face the first roll, a conveying unit arranged to face the second roll and configured to convey an electrode current collector, a measurement unit, and a control unit configured to control the peripheral speed of the second roll. Here, a gap is formed between the first roll and the second roll such that when the electrode material is supplied therein while rotating the first roll and the second roll, a coating film composed of the electrode material is formed. The second roll is configured so that the coating film composed of the electrode material adheres thereto. The measurement unit is configured to measure the thickness of the coating film that is composed of the electrode material adhered to the second roll, or measure information for obtaining the width of the gap. The second roll and the conveying unit are configured so that the coating film composed of the electrode material adhered to the second roll is transferred onto the electrode current collector. The control unit is configured to change the speed ratio between the peripheral speed of the second roll and the conveying speed of the electrode current collector by changing the peripheral speed of the second roll on the basis of the thickness of the coating film measured by the measurement unit, or the obtained width of the gap, and to allow the timing of the speed ratio change to be based on the Equation (1).

With such a configuration, it is possible to manufacture an electrode in which the variation in the basis weight of the transferred coating film composed of the electrode material is highly suppressed.

DESCRIPTION OF THE PREFERRED EMBODIMENTS

Figure 1:
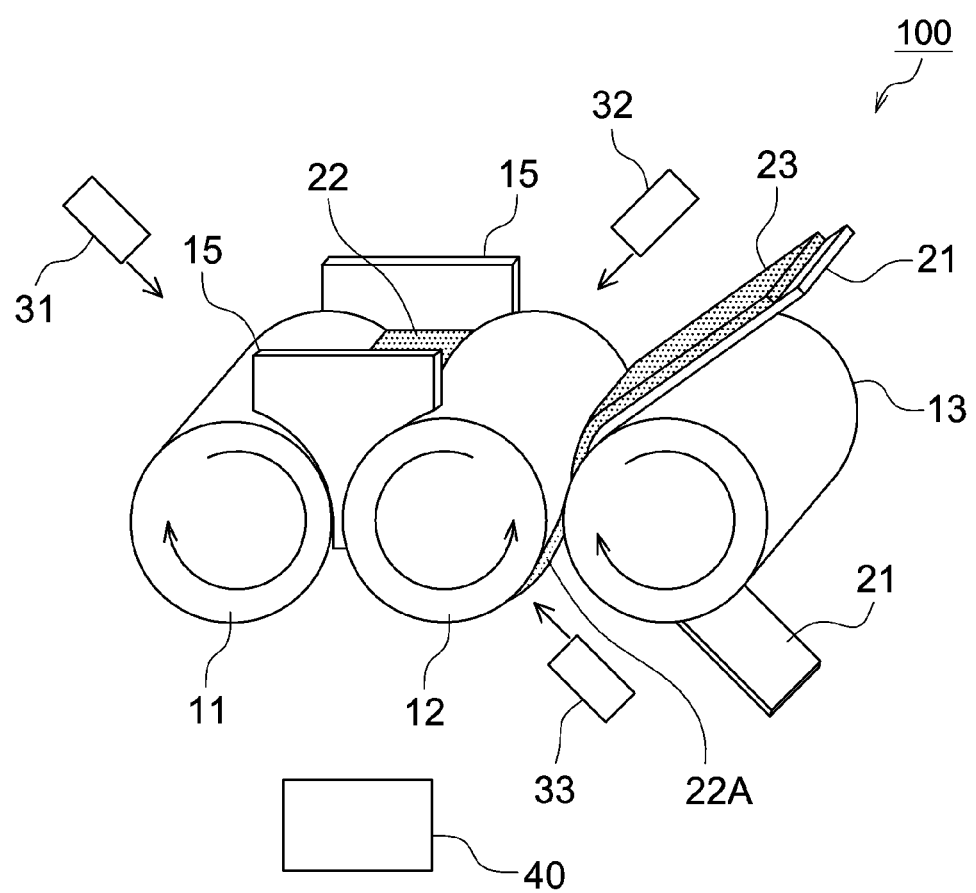
FIG. 1 is a schematic diagram for explaining a method for manufacturing an electrode according to an embodiment of the present disclosure.

Hereinafter, embodiments of the present disclosure will be described with reference to the drawings. Matters other than those specifically mentioned in the present description and necessary for implementation can be ascertained as design matters for a person skilled in the art that are based on the related art in the pertinent field. The present disclosure may be carried out based on the contents disclosed in the present specification and the common technical knowledge in the pertinent field. Further, in the following drawings, members/parts having the same function may be designated by the same reference numerals for the explanation. Further, the dimensional relations (length, width, thickness, etc.) in each drawing do not reflect the actual dimensional relations.

The method for manufacturing an electrode according to the present embodiment includes a step of forming a coating film composed of an electrode material by passing the electrode material through a gap between a rotating first roll and a rotating second roll (hereinafter, also referred to as "coating film formation step"), a step of adhering the coating film composed of the electrode material to the second roll and conveying the coating film (hereinafter, also referred to as "conveying step"), and a step of transferring the conveyed coating film onto an electrode current collector conveyed by a conveying device to form an electrode mixture layer composed of the coating film (hereinafter, also referred to as "transfer step"). Here, the speed ratio between a peripheral speed of the second roll and a conveying speed of the electrode current collector is changed by changing the peripheral speed of the second roll on the basis of the thickness of the coating film or the width of the gap. The timing of the change in the speed ratio is allowed to be based on the following Equation (1).

$$t = t_{\_const} \times \{B_x/B_{ave}\} \quad (1)$$

(a) where the peripheral speed of the second roll is changed based on the thickness of the coating film:
t: waiting time from the measurement of the thickness of the coating film adhered to the second roll to the execution of the peripheral speed change of the second roll;
$t_{\_const}$: set value of the waiting time from the measurement of the thickness of the coating film adhered to the second roll to the execution of the peripheral speed change of the second roll;
$B_x$: measured value of the thickness of the coating film adhered to the second roll;
$B_{ave}$: average of measured values of the thickness of the coating film adhered to the second roll.

(b) where the peripheral speed of the second roll is changed based on the width of the gap:
t: waiting time from coating film formation in the gap to execution of peripheral speed change of the second roll;
$t_{\_const}$: set value of the waiting time from coating film formation in the gap to execution of peripheral speed change of the second roll;
$B_x$: value of the gap width;
$B_{ave}$: average of values of the gap width.

FIG. 1 is a schematic diagram for explaining the method for manufacturing an electrode according to the present embodiment. An electrode manufacturing apparatus 100 shown in FIG. 1 is an example of an apparatus suitable for carrying out the manufacturing method. The apparatus for carrying out the method for manufacturing an electrode according to the present embodiment is not limited to the electrode manufacturing apparatus 100 shown in FIG. 1.

The electrode manufacturing apparatus 100 shown in FIG. 1 includes a first roll 11 (hereinafter, also referred to as "supply roll 11"), a second roll 12 (hereinafter, also referred to as "transfer roll 12"), and a third roll 13 (hereinafter, also referred to as "backup roll 13") as a conveying unit configured to convey the electrode current collector 21.

The supply roll 11 and the transfer roll 12 face each other. Specifically, the outer peripheral surface of the supply roll 11 and the outer peripheral surface of the transfer roll 12 face each other. The supply roll 11 and the transfer roll 12 rotate in opposite directions as shown by the arrows in FIG. 1. The transfer roll 12 is configured so that a coating film composed of an electrode material 22 adheres to the transfer roll 12. Specifically, the transfer roll 12 is configured to be rotatable at a peripheral speed higher than that of the supply roll 11.

There is a gap of a predetermined width between the supply roll 11 and the transfer roll 12. This gap forms a coating film composed of the electrode material when the electrode material is supplied therein while rotating the supply roll 11 and the transfer roll 12. In the present description, the "gap width" is the distance between the outer circumference of the supply roll 11 and the outer circumference of the transfer roll 12 on the line connecting the rotation axis of the supply roll 11 and the rotation axis of the transfer roll 12.

Partition walls 15 are provided at both ends of the supply roll 11 and the transfer roll 12 in the width direction. The partition walls 15 hold the electrode material 22 on the supply roll 11 and the transfer roll 12 and play a role of specifying the width of an electrode mixture layer 23 formed on an electrode current collector 21 by the distance between the two partition walls 15. An embodiment is also possible in which the electrode manufacturing apparatus 100 is not provided with the partition walls 15, a feeder including a nozzle having a shape matching the shape of the outer circumference of the rolls is used, and the nozzle of the feeder is arranged above the gap between the supply roll 11 and the transfer roll 12. In such an embodiment, the side surfaces of the feeder nozzle function as the partition walls 15.

The backup roll 13 is arranged next to the transfer roll 12. Therefore, the transfer roll 12 and the backup roll 13 face each other. Specifically, the outer peripheral surface of the transfer roll 12 and the outer peripheral surface of the backup roll 13 face each other. The transfer roll 12 and the backup roll 13 rotate in opposite directions as shown by the arrows in FIG. 1. The backup roll 13 is configured such that a coating film 22A composed of the electrode material adhered to the transfer roll 12 is transferred onto the electrode current collector 21. Specifically, for example, the backup roll 13 is configured to be rotatable at a peripheral speed larger than that of the transfer roll 12.

In FIG. 1, the rotation axis of the supply roll 11, the rotation axis of the transfer roll 12, and the rotation axis of the backup roll 13 are arranged so as to be aligned horizontally, but the arrangement of the supply roll 11, the transfer roll 12, and the backup roll 13 is not limited to the illustrated embodiment.

Further, the electrode manufacturing apparatus 100 includes a sensor 31, a sensor 32, and a sensor 33 as measuring units. The sensor 31 and the sensor 32 are for measuring information for obtaining the width of the gap. The sensor 33 is for measuring the thickness of the coating film 22A composed of the electrode material. Since it is sufficient to use either the thickness of the coating film or the gap width to obtain the effect of the manufacturing method according to the present embodiment, the electrode manufacturing apparatus 100 may include only the sensor 31 and the sensor 32. Alternatively, only the sensor 33 may be included.

The sensor 31 measures the position of the outer peripheral surface of the supply roll 11 and the displacement thereof. The sensor 32 measures the position of the outer peripheral surface of the transfer roll 12 and the displacement thereof. The width of the gap can be obtained by using the positions measured by the sensor 31 and the sensor 32 and the dimensions and peripheral speed of the supply roll 11 and the transfer roll 12. Known position sensors may be used for the sensor 31 and the sensor 32, and for example, a laser displacement sensor may be used. The configuration of the measuring unit for obtaining the width of the gap is not limited to this.

The sensor 33 measures the thickness of the coating film 22A composed of the electrode material adhered to the transfer roll 12. As the sensor 33, a known sensor for thickness measurement may be used, and for example, a laser displacement sensor may be used. The configuration of the measuring unit for determining the thickness of the coating film 22A is not limited to this.

The electrode manufacturing apparatus 100 further includes a control unit 40. The control unit 40 is connected to the supply roll 11, the transfer roll 12, and the backup roll 13 by wire or wirelessly, and is configured to control the peripheral speeds thereof. Further, the control unit 40 is connected to the sensor 31, the sensor 32, and the sensor 33 by wire or wirelessly, and is configured to receive the measurement results of these sensors. Further, the control unit 40 is configured to control the peripheral speed change of the transfer roll 12 based on the Equation (1) described hereinbelow. The control unit 40 is configured of a computer. The computer may include a CPU, a ROM in which a program for performing the peripheral speed change control of the transfer roll 12 based on the Equation (1) described hereinbelow is stored, a RAM, and the like. However, this configuration of the control unit 40 is not limiting as long as the peripheral speed change control of the transfer roll 12 based on the Equation (1) described hereinbelow is possible.

The coating film forming step of the method for manufacturing an electrode according to the present embodiment will be described hereinbelow. In the coating film forming step, first, the electrode material 22 is supplied between the rotating supply roll 11 and the rotating transfer roll 12.

The electrode material 22 may be in the form of paste, slurry, powder, and granulated material, but is desirably a granulated material, and more desirably a wet granulated material. The wet granulated material refers to a granulated material including a small amount of solvent (for example, 10% by mass or more and 30% by mass or less). The particle size of the granulated material may be larger than the width of the gap between the supply roll 11 and the transfer roll 12. For example, the width of the gap is usually about several tens of micro-meters (for example, 20 μm or more and 60 μm or less), and the particle size of the granulated product may be about several hundred micro-meters (for example, 200 μm or more and 300 μm or less).

An electrode material generally used for a secondary battery, particularly a lithium ion secondary battery, can be used as the electrode material 22.

When the electrode material 22 is a material for a positive electrode, for example, the electrode material 22 includes a positive electrode active material and a solvent. Examples of the positive electrode active material include lithium transition metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.8}Co_{0.15}Al_{0.5}O_2$, $LiNi_{0.5}Mn_{1.5}O_4$, and the like) and lithium transition metal phosphates ($LiFePO_4$ and the like), and the like. Examples of the solvent include N-methylpyrrolidone (NMP) and the like.

The electrode material 22 for the positive electrode may further include a conductive material, a binder, and the like. Examples of the conductive material include carbon black such as acetylene black (AB) and other carbon materials (graphite and the like). Examples of the binder include polyvinylidene fluoride (PVDF) and the like.

When the electrode material 22 is a material for a negative electrode, for example, the electrode material 22 includes a negative electrode active material and a solvent. Examples of the negative electrode active material include carbon materials such as graphite, hard carbon, and soft carbon. Examples of the solvent include water and the like.

The electrode material 22 for the negative electrode may further include a binder, a thickener, and the like. Examples of the binder include styrene butadiene rubber (SBR) and the like. Examples of the thickener include carboxymethyl cellulose (CMC) and the like.

The amount of each component in the electrode material 22 and the dry solids content of the electrode material 22 may be the same as those of known electrode materials for secondary batteries.

When the electrode material 22 is supplied between the supply roll 11 and the transfer roll 12, the electrode material 22 is carried to the gap between the supply roll 11 and the transfer roll 12 by the rotation of the supply roll 11 and the transfer roll 12. The electrode material 22 is then converted into a coating film when passing through the gap between the supply roll 11 and the transfer roll 12. Specifically, for example, the granulated material of the electrode material 22 is crushed by the supply roll 11 and the transfer roll 12, and the granulated bodies are integrated with each other and stretched to form the coating film 22A. In this way, the coating film forming step can be performed.

Here, the sensor 31 and the sensor 32 measure the position of the outer peripheral surface of the supply roll 11 and the position of the outer peripheral surface of the transfer roll 12, respectively. The width of the gap can be determined by using the positions measured by the sensor 31 and the sensor 32, and the dimensions and peripheral speeds of the supply roll 11 and the transfer roll 12. This measurement is performed continuously or intermittently to monitor a change in the width of the gap.

Next, the conveying step will be described. In the conveying step, it is necessary to selectively adhere the coating film to the transfer roll 12, but a method of selectively adhering the coating film 22A composed of the electrode material to the transfer roll 12 is well known. For example, the peripheral speed of the transfer roll 12 is set higher than the peripheral speed of the supply roll 11. The coating film 22A adhering to the transfer roll 12 is conveyed by the rotation of the transfer roll 12. In this way, the conveying step can be performed.

Here, the thickness of the coating film 22A composed of the electrode material adhered to the transfer roll 12 is measured by the sensor 33. This measurement is performed continuously or intermittently to monitor a change in the thickness of the coating film 22A of the electrode material.

Next, the transfer step will be described. A known electrode current collector for a secondary battery (particularly a lithium ion secondary battery) can be used as the electrode current collector 21, and a metal foil is desirably used. When manufacturing a positive electrode, aluminum foil is suitable as the electrode current collector 21. When manufacturing a negative electrode, a copper foil is suitable as the electrode current collector 21.

The thickness of the electrode current collector 21 is not particularly limited, and is, for example, 5 μm or more and 35 μm or less, desirably 7 μm or more and 20 μm or less.

A method of selectively adhering the coating film 22A composed of an electrode material to the electrode current collector 21 is well known. For example, it is possible to set the peripheral speed of the backup roll 13 to be higher than the peripheral speed of the transfer roll 12 and bring the coating film 22A composed of the electrode material adhering to the surface of the transfer roll 12 with a certain pressure into contact with the electrode current collector 21 conveyed by the backup roll 13, thereby transferring the coating film 22A composed of the electrode material to the electrode current collector 21. As a result, the electrode mixture layer 23 is formed on the electrode current collector 21.

At this time, the speed ratio between the peripheral speed of the transfer roll 12 and the conveying speed of the electrode current collector 21 is changed based on the thickness of the coating film 22A or the width of the gap. The control for changing this speed ratio is based on either the thickness of the coating film 22A or the width of the gap. Therefore, in the present embodiment, the variation of the gap width is monitored by the sensor 31 and the sensor 32, and the variation of the thickness of the coating film 22A is monitored by the sensor 33, but it is sufficient to monitor only one of the thickness of the coating film 22A and the width of the gap.

Here, where the speed ratio between the rotation speed of the transfer roll 12 and the conveying speed of the electrode current collector 21 is constant, when the thickness of the coating film 22A composed of the electrode material is large, the weight per unit area of the electrode mixture layer 23 transferred to the electrode current collector 21 is large. Meanwhile, when the thickness of the coating film 22A composed of the electrode material is small, the weight per unit area of the electrode mixture layer 23 transferred to the electrode current collector 21 is small.

Further, where the thickness of the coating film 22A composed of the electrode material is constant, when the ratio of the conveying speed of the electrode current collector 21 to the rotation speed of the transfer roll 12 is large, the weight per unit area of the electrode mixture layer 23 transferred to the electrode current collector 21 is small. Meanwhile, when the ratio of the conveying speed of the electrode current collector 21 to the rotation speed of the transfer roll 12 is small, the weight per unit area of the electrode mixture layer 23 transferred to the electrode current collector 21 is large.

The thickness of the coating film 22A composed of the electrode material depends on the width of the gap between the supply roll 11 and the transfer roll 12, and the thickness of the coating film 22A composed of the electrode material and the width of the gap correlate with each other.

Therefore, in consideration of this, the variation in the weight per unit area of the electrode mixture layer 23 transferred to the electrode current collector 21 can be reduced by changing the speed ratio between the rotation speed of the transfer roll 12 and the conveying speed of the electrode current collector 21 according to the thickness of the coating film 22A composed of the electrode material transferred onto the electrode current collector 21 or the width of the gap.

Specifically, for example, in order to accurately and effectively reduce the variation in the weight per unit area of the electrode mixture layer 23, in the case where the coating film 22A composed of the electrode material is formed when the width of the gap between the supply roll 11 and the transfer roll 12 is large (larger than the average), the conveying speed of the electrode current collector 21 is increased relative to the rotation speed of the transfer roll 12 when the coating film 22A is transferred onto the electrode current collector 21. In the case where the coating film 22A composed of the electrode material is formed when the width of the gap between the supply roll 11 and the transfer roll 12 is small (smaller than the average), the conveying speed of the electrode current collector 21 is reduced relative to the rotation speed of the transfer roll 12 when the coating film 22A is transferred onto the electrode current collector 21.

Alternatively, in order to accurately and effectively reduce the variation in the weight per unit area of the electrode mixture layer 23, where the thickness of the coating film 22A composed of the electrode material is large (larger than the average), the conveying speed of the electrode current collector 21 is increased relative to the rotation speed of the transfer roll 12 when the coating film 22A is transferred onto the electrode current collector 21. Where the thickness of the coating film 22A composed of the electrode material is small (smaller than the average), the conveying speed of the electrode current collector 21 is reduced relative to the rotation speed of the transfer roll 12 when the coating film 22A is transferred onto the electrode current collector 21.

In this regard, more specific contents are as described in Japanese Patent Application Publication No. 2016-219343 and Japanese Patent Application Publication No. 2018-37198.

Here, in the present embodiment, the speed ratio between the peripheral speed of the transfer roll 12 and the conveying speed of the electrode current collector 21 is changed by changing the peripheral speed of the transfer roll 12.

Here, the change of the speed ratio is performed when the coating film 22A composed of the electrode material reaches the position where it comes into contact with the electrode current collector 21. In the case (a) where the speed ratio is changed based on the thickness of the coating film 22A composed of the electrode material, the time required for the coating film 22A composed of the electrode material to reach from the measurement position of the thickness to a position where the coating film comes into contact with the electrode current collector 21 is taken as $t_A$. The control for changing the speed ratio is performed after time $t_A$ after measuring the thickness.

Here, Japanese Patent Application Publication No. 2016-219343 and Japanese Patent Application Publication No. 2018-37198 do not mention this time $t_A$. The results of the study conducted by the present inventors with respect to this time revealed a new problem that where the peripheral speed of the transfer roll 12 is changed in order to change the speed ratio under the condition that seems to be usually adopted, that is, the condition that the time $t_A$ is constant, although the variation in the weight per unit area of the coating film 22A composed of the electrode material transferred to the electrode current collector 21 is reduced, some variation still remains.

Therefore, in the present embodiment, in the case (a) where the speed ratio is changed based on the thickness of the coating film 22A, the peripheral speed of the transfer roll 12 is changed by allowing the timing for changing the speed ratio to be based the following Equation (1).

$$t = t_{\_const} \times \{B_x/B_{ave})\} \quad (1)$$

t: waiting time from the measurement of the thickness of the coating film adhered to the transfer roll 12 to the execution of the peripheral speed change of the transfer roll 12;

$t_{\_const}$: set value of the waiting time from the measurement of the thickness of the coating film adhered to the transfer roll 12 to the execution of the peripheral speed change of the transfer roll 12;

$B_x$: measured value of the thickness of the coating film adhered to the transfer roll 12;

$B_{ave}$: average of measured values of the thickness of the coating film adhered to the transfer roll 12.

Specifically, in the example shown in FIG. 1, the speed ratio is changed as follows. The sensor 33 measures the variation in the thickness of the coating film 22A adhered to the transfer roll 12, and the control unit 40 receives the measurement result to determine the measured value of the thickness of the coating film adhered to the transfer roll 12. Meanwhile, the waiting time set value $t_{\_const}$ is calculated from the distance between the thickness measurement position by the sensor 33 and the electrode current collector 21 along the outer circumference of the transfer roll 12 and the set value of the peripheral speed of the transfer roll 12, and the waiting time set value $t_{\_const}$ is input to the control unit 40. The thickness of the coating film 22A adhered to the transfer roll 12 is measured by the sensor 33, the waiting time until the peripheral speed change is executed is calculated based on the Equation (1) by using the measured value of the thickness, the peripheral speed of the transfer roll 12 is changed after the waiting time, and the speed ratio change control is executed.

Similarly, in the case (b) where the speed ratio is changed based on the width of the gap, the time required for the coating film 22A composed of the electrode material to reach the position of contact with the electrode current collector 21 from the position of the gap is taken as $t_B$. The change of the speed ratio is performed after the time $t_B$ from the time when the electrode material 22 was formed into the coating film by the gap.

When the time $t_B$ is kept constant, where the peripheral speed of the transfer roll 12 is changed to change the speed ratio, although the weight per unit area of the coating film 22A composed of the electrode material that is to be transferred to the electrode current collector 21 is reduced, some variation thereof still remains.

Therefore, in the present embodiment, in the case (b) where the speed ratio is changed based on the width of the gap, the peripheral speed of the transfer roll 12 is changed by allowing the timing for changing the speed ratio to be based on the following Equation (1).

$$t = t_{\_const} \times \{B_x/B_{ave})\} \quad (1)$$

t: waiting time from coating film formation in the gap to execution of peripheral speed change of the second roll;

$t_{\_const}$: set value of the waiting time from coating film formation in the gap to execution of peripheral speed change of the second roll;

$B_x$: value of the gap width;

$B_{ave}$: average of values of the gap width.

In the example shown in FIG. 1, the speed ratio is changed as follows. The sensor 31 and the sensor 32 measure the position of the outer peripheral surface of the supply roll 11 and the position of the outer peripheral surface of the transfer roll 12, and the control unit 40 receives the measurement result and determines the value of the gap width between the supply roll 11 and the transfer roll 12 and the variation thereof. The average value of the gap width is determined. Meanwhile, the waiting time set value $t_{\_const}$ is calculated from the distance between the gap position and the electrode current collector 21 along the outer circumference of the transfer roll 12 and the set value of the peripheral speed of the transfer roll 12, and the waiting time set value $t_{\_const}$ is inputted to the control unit 40. The sensor 31 and the sensor 32 measure the position of the outer peripheral surface of the supply roll 11 and the position of the outer peripheral surface of the transfer roll 12, and the control unit 40 determines the width of the gap, uses the value of the width of the gap to calculate the waiting time until the peripheral speed control is executed based on the Equation (1), changes the peripheral speed of the transfer roll 12 after the waiting time, and executes the speed ratio change control.

In the manufacture of an electrode including forming a coating film of an electrode material with rolls and transferring the coating film to a current collector, the present inventors have actually performed a test of changing the speed ratio between the peripheral speed of a transfer roll and the conveying speed of an electrode current collector on the basis of the thickness of the coating film composed of the electrode material. In the test, the speed ratio was changed by changing the peripheral speed of the transfer roll. This test was carried out in the case where the timing of the change of the speed ratio was made constant and in the case where the peripheral speed change control of the transfer roll was performed based on the Equation (1).

Figure 2:
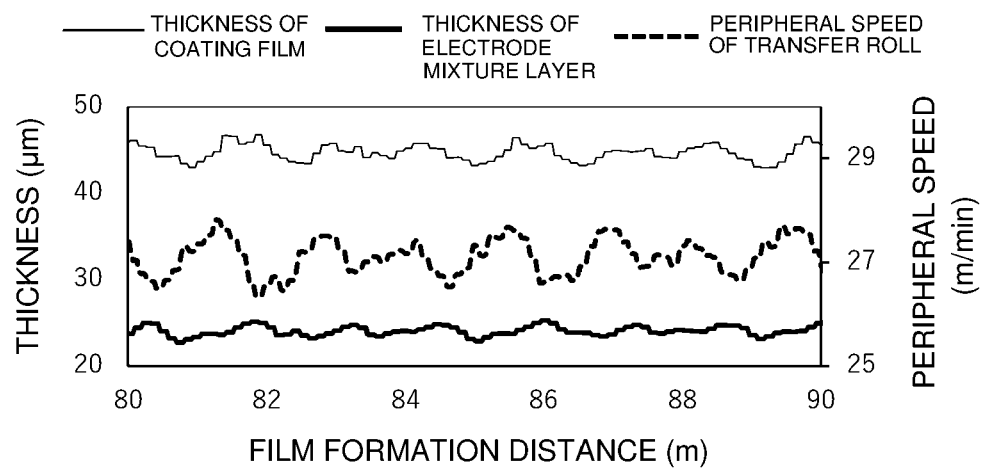
FIG. 2 is a graph showing variations in the thickness of the coating film on the transfer roll, the peripheral speed of the transfer roll, and the thickness of the transferred electrode mixture layer when the timing of the change of the speed ratio is fixed.

The variations in the thickness of the coating film on the transfer roll, the peripheral speed of the transfer roll, and the thickness of the transferred electrode mixture layer when the timing of the change of the speed ratio was kept constant at the waiting time set value $t_{\_const}$ are shown in FIG. 2. Further, the variation in the weight per unit area of the electrode mixture layer at this time is shown in FIG. 3.

Figure 4:
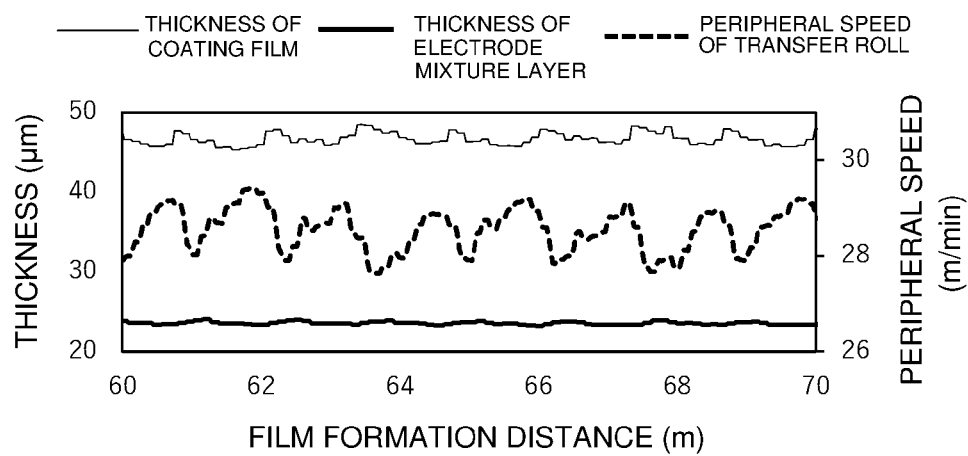
FIG. 4 is a graph showing variations in the thickness of the coating film on the transfer roll, the peripheral speed of the transfer roll, and the thickness of the transferred electrode mixture layer when the timing of the change of the speed ratio is based on the Equation (1)

Further, the variations in the thickness of the coating film on the transfer roll, the peripheral speed of the transfer roll, and the thickness of the transferred electrode mixture layer when the timing of the change of the speed ratio was set to t according to the Equation (1) are shown in FIG. 4. Further, the variation in the weight per unit area of the electrode mixture layer at this time is shown in FIG. 5.

Figure 3:
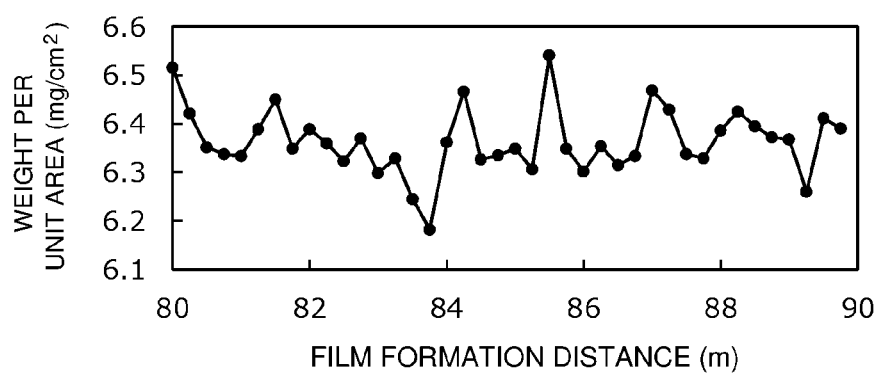
FIG. 3 is a graph showing variations in the weight per unit area of the electrode mixture layer in the case illustrated by FIG. 2.
Figure 5:
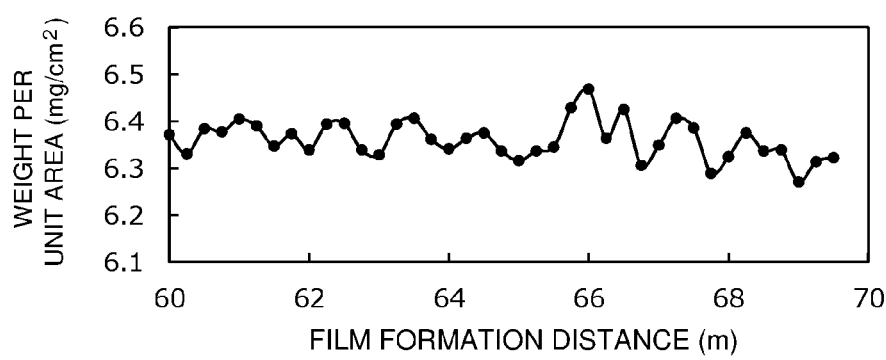
FIG. 5 is a graph showing variations in the weight per unit area of the electrode mixture layer in the case illustrated by FIG. 4.

As is clear from the comparison between FIGS. 3 and 5, when the timing of the change of the speed ratio is set to t (that is, changed) according to the Equation (1), the variation in the weight per unit area of the electrode mixture layer is significantly reduced. In numerical comparison, the variation in the weight per unit area in FIG. 3 is 6.36 mg/cm$^2$±2.9%, whereas the variation in the weight per unit area in FIG. 5 is 6.36 mg/cm$^2$±1.6%, and it can be seen that the variation in the weight per unit area of the electrode mixture layer is significantly reduced.

Therefore, from the above, it is demonstrated that the variation in the weight per unit area of the electrode mixture layer can be significantly reduced when the timing of the change of the speed ratio due to the change of the peripheral speed of the transfer roll is based on the Equation (1).

In the method for manufacturing an electrode according to the present embodiment, if necessary, a step (drying step) of drying the formed electrode mixture layer 23 may be performed. The drying step can be carried out according to a known method. For example, the drying step can be performed by conveying the electrode current collector 21 on which the electrode mixture layer 23 has been formed to a drying furnace (not shown) and heating to remove the solvent contained in the electrode mixture layer 23.

In the method for manufacturing an electrode according to the present embodiment, if necessary, a step (pressing step) of pressing the formed electrode mixture layer 23 may be performed for the purpose of increasing the density of the electrode mixture layer 23. The pressing step can be performed according to a known method.

As described above, it is possible to obtain an electrode in which variations in the weight per unit area of the electrode mixture layer are highly suppressed.

The electrode obtained by the manufacturing method according to the present embodiment can be suitably used as an electrode of a secondary battery such as a lithium ion secondary battery according to a known method. Therefore, the method for manufacturing an electrode according to the present embodiment is desirably a method for manufacturing an electrode for a secondary battery (in particular, a lithium ion secondary battery).

In the present description, the "secondary battery" refers to a power storage device that can be charged and discharged repeatedly, and is a term inclusive of a so-called storage battery and a power storage element such as an electric double layer capacitor. Further, in the present description, the "lithium secondary battery" refers to a secondary battery that uses lithium ions as a charge carrier and realizes charge/discharge by the transfer of charges by the lithium ions between the positive and negative electrodes.

A secondary battery produced using the electrode obtained by the manufacturing method according to the present embodiment, in particular a lithium ion secondary battery, can be used for various purposes. Suitable applications include a drive power source mounted on a vehicle such as an electric vehicle (EV), a hybrid vehicle (HV), and a plug-in hybrid vehicle (PHV); a storage battery of a small power storage device, and the like.

Although specific examples of the present disclosure have been described in detail above, these are merely examples and do not limit the scope of claims. The features set forth in the claims include various changes and modifications of the specific examples illustrated hereinabove.

What is claimed is:

1. A method for manufacturing an electrode, the method comprising:

forming a coating film composed of an electrode material by passing the electrode material through a gap between a rotating first roll and a rotating second roll, the gap having a width defined by a distance between an outer circumference of the first roll and an outer circumference of the second roll;

adhering the coating film composed of the electrode material to the second roll and conveying the coating film;

measuring the thickness of the coating film adhered to the second roll or measuring the width of the gap;

transferring the conveyed coating film onto an electrode current collector conveyed by a conveying device to form an electrode mixture layer composed of the coating film; and changing a speed ratio between a peripheral speed of the second roll and a conveying speed of the electrode current collector by changing the peripheral speed of the second roll on the basis of the measured thickness of the coating film or the measured width of the gap; and calculating a timing of the change in the speed ratio using Equation (1):

$$t = t_{\_const} \times (B_x / B_{ave}) \qquad (1), \text{wherein}$$

(a) when the peripheral speed of the second roll is changed based on the measured thickness of the coating film, the variables in Equation (1) are defined as follows:

t: a waiting time from the measurement of the thickness of the coating film adhered to the second roll to an execution of the peripheral speed change of the second roll;

$t_{\_const}$: a set value of a waiting time from the measurement of the thickness of the coating film adhered to the second roll to the execution of the peripheral speed change of the second roll;

$B_x$: the measured value of the thickness of the coating film adhered to the second roll;

$B_{ave}$: an average of measured values of the thickness of the coating film adhered to the second roll;

(b) when the peripheral speed of the second roll is changed based on the measured width of the gap, the variables in Equation (1) are defined as follows:

t: a waiting time from coating film formation in the gap to an execution of peripheral speed change of the second roll;

$t_{\_const}$: a set value of a waiting time from coating film formation in the gap to the execution of peripheral speed change of the second roll;

$B_x$: the measured value of the gap width;

$B_{ave}$: an average of measured values of the gap width;

wherein the speed ratio is changed at the calculated timing.

2. The method for manufacturing an electrode according to claim 1, wherein the electrode material is a wet granulated material.

\* \* \* \* \*